United States Patent

[11] 3,633,678

| [72] | Inventor | Lucien Leduc<br>Box 368, Assiniboia, Saskatchewan, Canada |
|---|---|---|
| [21] | Appl. No. | 834,046 |
| [22] | Filed | June 17, 1969 |
| [45] | Patented | Jan. 11, 1972 |

[54] RECIPROCATING WEEDERS
8 Claims, 4 Drawing Figs.

[52] U.S. Cl. .................................................. 172/44,
172/96, 172/102, 172/265, 172/720
[51] Int. Cl. .................................................. A01b 39/19
[50] Field of Search........................................ 172/44, 53,
54, 61, 62, 84, 88, 91, 92, 93, 94, 95, 96, 101, 102,
117, 125, 698, 720

[56] References Cited
UNITED STATES PATENTS

| 2,123,972 | 7/1938 | Simpson...................... | 172/96 |
| 2,572,203 | 10/1951 | Scheidenhelm.............. | 172/102 |

*Primary Examiner*—Robert E. Pulfrey
*Assistant Examiner*—C. W. Hanor
*Attorney*—Kent & Ade

ABSTRACT: A taut weeding cable carried below and transversely from an implement frame, said frame being elevatably mounted on supporting wheels for adjustable lowering of said cable into the ground, and for raising same therefrom; screw means for tightening the cable; power operable means for endwise reciprocating the cable in the ground to destroy weeds therein as the implement moves over the ground; and spring means for resiliently resisting cable pressures against imbedded objects as they are encountered.

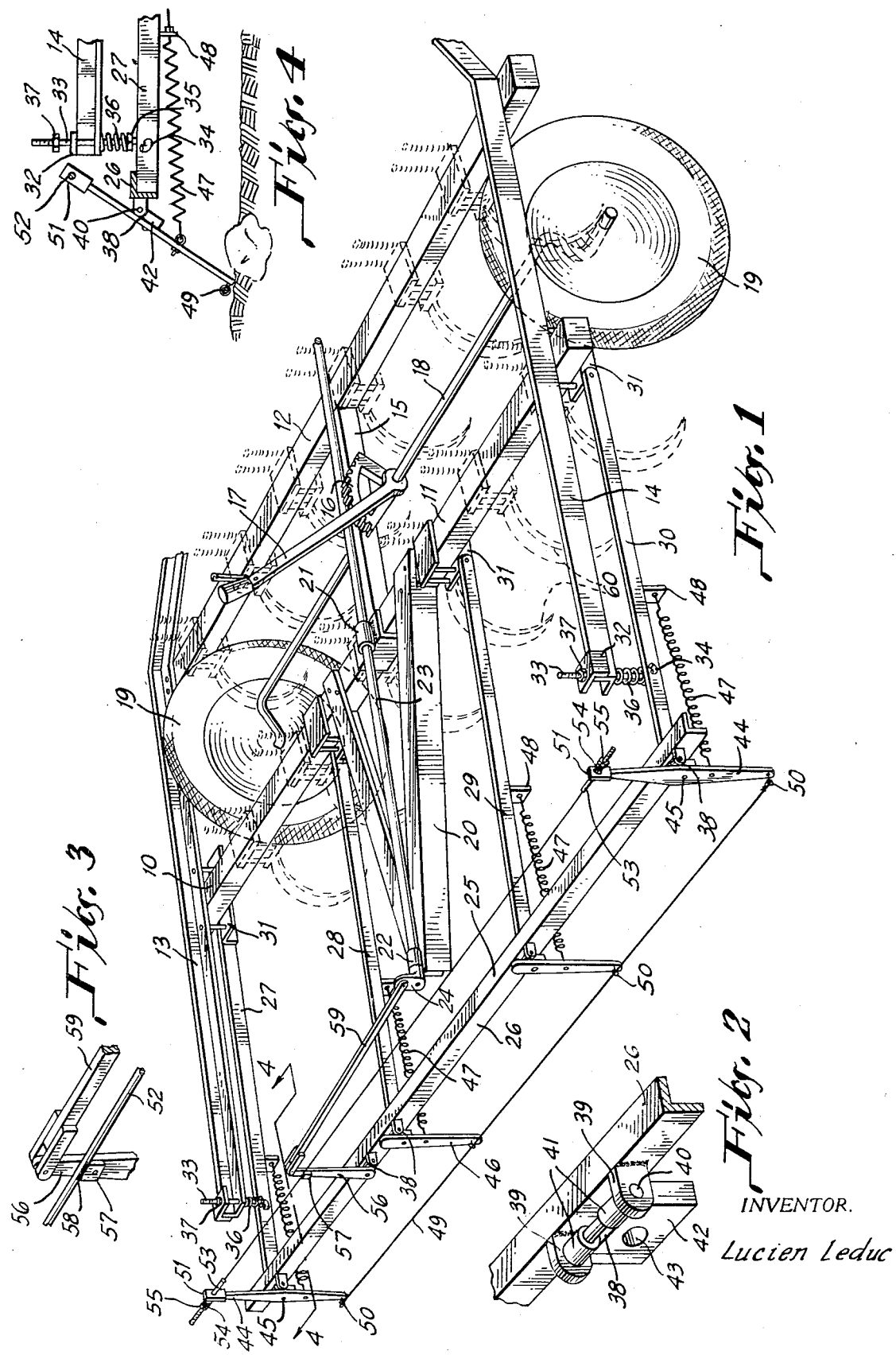

RECIPROCATING WEEDERS

The principal object of the present invention is: to power endwise-reciprocate a cable of a weeding implement through the ground as the portable frame thereof passes over the ground, and so break up and work weeds to the surface for extermination by solar energy.

Further objects of the invention are: to construct the device on a separate frame for use on summer fallow, or designed as an attachment to or integral with a cultivator, a hoe or a seed drill, to follow up behind the land-working tools thereof, for said weed extermination and to cover up seed by closing the furrows.

A further advantageous object of this weeding device is: to use the reciprocating cable as a subsurface coil compacter, by sifting the fine soil down, leaving the lumps and trash on top, thus insuring against soil drifting and providing perfect generating conditions for the covered seed, in weed-free land.

Further objects of the invention are: to provide means on the weeding implement for adjustably lowering the reciprocating cable into the earth, or lifting same therefrom; provide means for retracting sections of the cable when it resiliently encounters buried objects, and so permit cable escape therefrom; and provide resilient means for preventing cable stretch when passing said objects.

A further object of the invention is: to provide adjustable means for resiliently holding the cable in the ground while operating, and against variable resistance of the soil.

Still further objects of the invention are: to construct the invention in a simple, economical and durable manner, for simplicity of operation, including reasonable manufacturing costs and selling prices, and many years of satisfactory trouble-free operation.

With the above important, and other minor objects in view, which will become more apparent as the disclosure proceeds, the invention consists essentially in the design, construction and arrangement of the various parts hereinafter more particularly described, reference being had to the accompanying drawings wherein:

FIG. 1 is a complete perspective view of the implement, with spring tooth cultivator shanks indicated in dotted outline.

FIG. 2 is an enlarged partial perspective view of the pivot bearing used for the cable prongs.

FIG. 3 is an enlarged partial perspective view showing the operational drive to the tightening wire of the weeding cable.

FIG. 4 is a vertical section taken on the line 4—4 of FIG. 1 and showing the retraction of one of the prongs, when encountering a stone.

In the drawings like characters of reference indicate corresponding parts in the several figures.

A main frame is generally indicated by the reference 10, and comprises a pair of spaced square crossbeams 11 and 12, connected at each end by side angle irons 13 and 14, which extend ahead and converge to form a hitch (not shown). The beams 11 and 12 are centrally connected by a short square beam 15, which supports a quadrant 16, over which a lever 17 operates to rockably control a cranked axle 18, and the lowering and raising of the frame 10 on side ground wheels 19. Actually, the lever 17 is preferably short and power operated (not shown). The supports and bearings for the axle 18 are not shown.

The central rear part of the frame 10 carries a V-shaped rear extension 20 and a central bearing 21. The rear point of the extension also carries a bearing 22 which is aligned with that 21 to rotatably receive a shaft 23, the front end of which is adapted to be driven by the power takeoff, or the hydraulic power, of a hauling tractor (not shown). The rear end of the shaft 23 operates a crank 24 for a purpose later explained. If desired, an eccentric (not shown) could be substituted for this crank.

A rear rake frame is indicated at 25 and comprises a cross angle 26 having four spaced tongues or angles 27, 28, 29 and 30 rigidly and forwardly extending therefrom to pivot on short angles 31 carried under the beam 11, so the rake frame can pivot up and down on the back of the main frame. It will be noticed that the rear ends of the angle irons 13 and 14 of the main frame extend over the angles 27 and 30 of the rake frame. Short angle brackets 32 are carried by these rear ends of the main frame, which with the lower flanges of the angles 13 and 14, slidably receive vertical rods 33, the lower ends of which are hooked outwardly and pivotally pass through the latter mentioned rake frame angles at 34, for their support. The upper ends of the hooked rods 33 are threaded to receive lower nuts 35 (FIG. 4) which support and compress telescoping coil springs 36 up against the angles 13 and 14 until upper nuts on the rods contact said latter angles, and so support the rake frame 25.

Pivot bearing 38 are provided at spaced intervals along the rake frame angle 26 (best shown in FIG. 2). These pivot bearings consist of a spaced pair of rear-extending lugs 39 which are welded to the angle and drilled horizontally for the reception of a headed pivot pin 40 which supports a pair of inner spaced tubes 41 which are welded to the upper edge of a rectangular plate 42, having a central hole 43. A pair of lever prongs 44 are centrally bolted at 45, one to each end pivot bearing 38, and the bolts pass through the holes 43, so the bottom of the lever prongs can swing back on the pivot pins 40 while at the same time they can rock sideways on the bolts 45. A further pair of stub prongs 46 are evenly positioned between the lever prongs, and have their upper ends carried by similar pivot bearings 38 from the angle 26 to operate in the same manner. The four prongs are all held vertically against the angle 26 by separate and individual coil springs 47 in the manner of a rake, the front ends of the springs hooking onto suitable plates 48 carried by the angles 27, 28, 29 and 30.

The lower ends of all the above prongs are secured to a cross-weeding cable or flexible line 49, such as by small U-bolts 5. The upper ends of the lever prongs are each provided with a short flat plate 51 which extends thereabove. A tightening wire 52 has each end welded to a short threaded rod 53, each of which project through one of the plates 51, then through a tough little coil spring 54, to receive a nut 55. When these latter nuts are tightened against the springs 54, the wire 52 resiliently holds the lower weeding cable 49 taut.

An upper lever 56 has its lower end similarly pivot-carried by a further bearing 38 on the angle 26. The upper end of this latter lever pivotally carries a square block 57 over which the tightening wire 52 passes, and to which it is welded at 58 (see FIG. 3). The extreme upper end of the lever 56 is pivotally connected to the crank 24 of the driven shaft 23 by a pitman 59. Accordingly, when the shaft 23 is power driven, the tightening wire 52 and the cable 49 are reciprocated, and all the prongs are pivoting.

In operation; the elevator lever 17 is manually or power operated to lower the main frame 10 while the machine is moving over the ground, and so causes the cable 49 to enter the soil while being reciprocated by the rotation of the shaft 23. The resistance to this entry reacts through the rake frame 25 to compress the coil springs 36 and lift the nuts 37 (see FIG. 4). Accordingly, the cable 49 is resiliently held in the ground to fluctuate as the resistance of said ground varies, while the prongs 44 and 46 are swinging from side to side causing the cable 49 thereon to slice through the subsoil, breaking up weeds and working them to the surface. This operation is especially efficacious when the cable is following up behind cultivator teeth or plows, such as indicated in dotted outline at 60 in FIG. 1.

Naturally, the cultivator-broken land is much easier worked. At the same time, dry loose earth is worked downward to prevent soil drifting by the wind. If hoes or drills are substituted for the cultivator teeth, the furrows produced will be covered, and if seeded, they will be well packed with moist earth for early germination. If the reciprocating cable should strike buried objects, such as the stone shown in FIG. 4, the pivot bearings 38 will permit the prongs to swing back while still pivoting sideways and so permit the cable to escape. Naturally, this movement will create a stretching strain on the cable, which will be taken up by the tough little coil springs 54 of the tightening wire 52, and when the prongs return under the pull of the springs 47, the springs 54 will again tighten to maintain the cable taut. When the elevator lever 17 is again operated to lift the main frame, the springs 36 will expand until the nuts 37 contact the angle brackets 32. The rods 33 will then lift the rake frame, and the cable 49 clear of the ground. The nuts 35 are used to adjust the springs 36 and the resilient pressure on the cable 49 when in the ground, while the nuts 37 limit the distance of the cable 49 from the main frame when being supported therefrom, or the depth the cable can penetrate the ground.

From the above it will be seen that the reciprocating cable can be used on various farm implements with very beneficial results, or it can be built with its own frame as an independent implement, as shown by the solid lines of the drawings in FIG. 1.

What I claim as my invention is:

1. A reciprocating weeder, comprising: a mobile implement frame; a transverse cable carried from and below said frame; means for adjustably holding said cable taut; control means for lowering and raising the cable into and out of the ground respectively; and power operable means for bodily endwise reciprocation of said cable when in the ground, and said frame is moving thereover.

2. A reciprocating weeder as defined in claim 1 wherein said cable is carried on the lower ends of a series of downwardly extending prongs, each prong mounted for side pivoting movement in unison and operable by eccentric means.

3. A reciprocating weeder as defined in claim 1 wherein said cable is carried on the lower ends of a series of downwardly extending prongs, each prong mounted for side pivoting movement in unison and operable by a crank; and the two outer prongs of said series extending upwardly past their pivots and adjustably connected together for holding the cable in said taut condition.

4. A reciprocating weeder as defined in claim 1 wherein said control means comprises a lever-operable cranked shaft for lowering and raising said frame on its mobile support.

5. A reciprocating weeder, comprising: a mobile main frame; a transverse cable carried from and below said main frame; control means for lowering and raising the cable into and out of the ground respectively; said cable carried on the lower ends of a series of downwardly extending prongs, each prong mounted for side pivoting movement in unison; said prongs also mounted for individual rear pivoting movement against resilience, to avoid ground-buried objects; the two outer prongs of said series extending upwardly past their pivots for an adjustable connection therebetween, to maintain the cable in taut condition; and power operable means for bodily endwise reciprocation of said cable in the ground to eradicate weeds while said main frame is moving over the ground.

6. A reciprocating weeder as defined in claim 5 wherein a spring is interposed in said adjustable connection to absorb cable strain when a buried object is encountered; and said power operable means comprises a driven crank connected to and controlling said adjustable connection.

7. A reciprocating weeder as defined in claim 5 wherein said cable is carried by a rake frame hinged to and normally supported by said main frame; and releasable spring means interposed between the main frame and said rake frame for resilient downward pressure on said cable, when in the ground.

8. A reciprocating weeder as defined in claim 5 wherein said frame is supported on wheels and said control means comprises a lever-operable cranked shaft for lowering and raising said frame on said wheels.

* * * * *